United States Patent
Horii et al.

(10) Patent No.: US 11,526,217 B2
(45) Date of Patent: Dec. 13, 2022

(54) STYLUS

(71) Applicant: Hewlett-Packard Development Company, L.P., Spring, TX (US)

(72) Inventors: Hiroshi Horii, Palo Alto, CA (US); Ian N Robinson, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/754,833

(22) PCT Filed: Oct. 30, 2017

(86) PCT No.: PCT/US2017/059013
§ 371 (c)(1),
(2) Date: Apr. 9, 2020

(87) PCT Pub. No.: WO2019/088973
PCT Pub. Date: May 9, 2019

(65) Prior Publication Data
US 2021/0200344 A1 Jul. 1, 2021

(51) Int. Cl.
*G06F 3/048* (2013.01)
*G06F 3/0354* (2013.01)
*G06F 3/038* (2013.01)
*G06F 3/03* (2006.01)

(52) U.S. Cl.
CPC ........ *G06F 3/03545* (2013.01); *G06F 3/0383* (2013.01); *G06F 3/048* (2013.01); *G06F 3/03* (2013.01)

(58) Field of Classification Search
None
See application file for complete search history.

(56) References Cited

U.S. PATENT DOCUMENTS

| | | |
|---|---|---|
| 4,707,571 A | 11/1987 | Clements et al. |
| 5,004,871 A | 4/1991 | Purcell |
| 5,061,828 A | 10/1991 | Purcell |
| 5,940,158 A | 8/1999 | Kawabata |
| 6,556,190 B2 | 4/2003 | Fleck et al. |
| 7,454,977 B2 | 11/2008 | Larsen et al. |
| 9,063,588 B2 | 6/2015 | Buelow et al. |
| 9,116,560 B1 | 8/2015 | Habash |
| 9,632,600 B2 | 4/2017 | Chen et al. |
| 9,696,819 B2 | 7/2017 | Mercea et al. |
| 2003/0214490 A1 | 11/2003 | Cool |
| 2009/0240195 A1* | 9/2009 | Schrul ............... A61M 5/31595 604/71 |
| 2012/0331546 A1 | 12/2012 | Falkenburg et al. |

(Continued)

OTHER PUBLICATIONS

Adonit Touch, http://www.adonit.net/jot/touch/ (retrieved from the Internet Aug. 30, 2017).

*Primary Examiner* — Xuyang Xia
(74) *Attorney, Agent, or Firm* — Quarles & Brady LLP

(57) ABSTRACT

A stylus includes a housing, a tip portion at an end of the housing, and a control module within the housing, with the housing including a shape-changeable portion, and the control module to generate a first signal in response to the shape-changeable portion of the housing having a first effective cross-sectional area and generate a second signal in response to the shape-changeable portion of the housing having a second, different effective cross-sectional area.

20 Claims, 6 Drawing Sheets

(56) References Cited

U.S. PATENT DOCUMENTS

| | | |
|---|---|---|
| 2013/0271431 A1 | 10/2013 | Besperstov |
| 2013/0321359 A1 | 12/2013 | Zeliff et al. |
| 2014/0028635 A1 | 1/2014 | Krah |
| 2014/0029182 A1* | 1/2014 | Ashcraft ............. G06F 3/03545 361/679.4 |
| 2014/0276894 A1* | 9/2014 | Ramsay ............. A61B 17/7076 606/104 |
| 2015/0022464 A1* | 1/2015 | Schantz ................ G06F 1/1626 345/173 |
| 2015/0338933 A1* | 11/2015 | Holz ................... G06F 3/03545 345/179 |
| 2016/0179222 A1 | 6/2016 | Chang |
| 2016/0299584 A1* | 10/2016 | Clark .................. G06F 3/03545 |
| 2017/0068339 A1 | 3/2017 | Zimmerman et al. |
| 2017/0139492 A1 | 5/2017 | Chang et al. |
| 2017/0228053 A1 | 8/2017 | Short et al. |
| 2017/0277286 A1 | 9/2017 | Chiu et al. |
| 2018/0333980 A1* | 11/2018 | Namiki .................. B43K 29/02 |

* cited by examiner

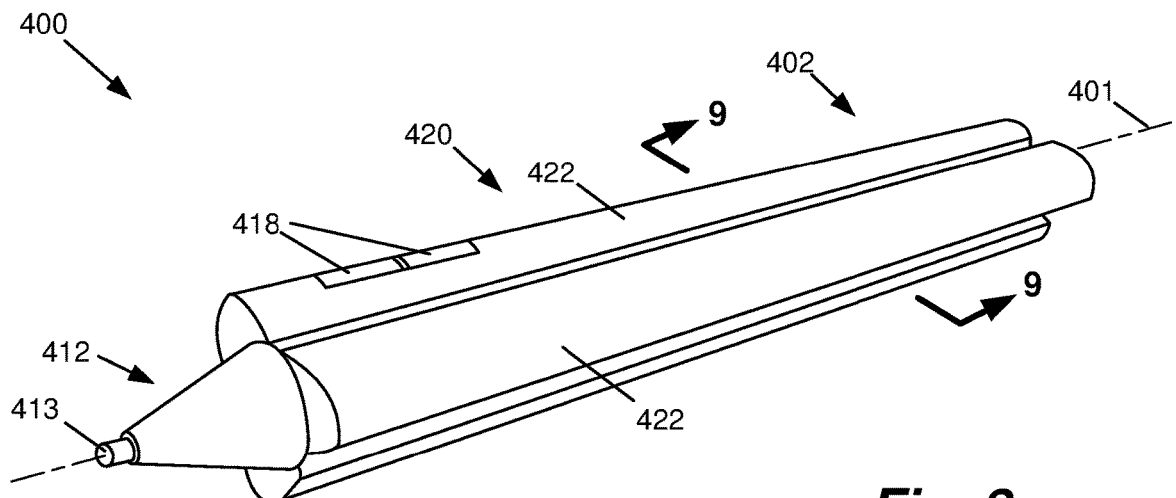
*Fig. 8*
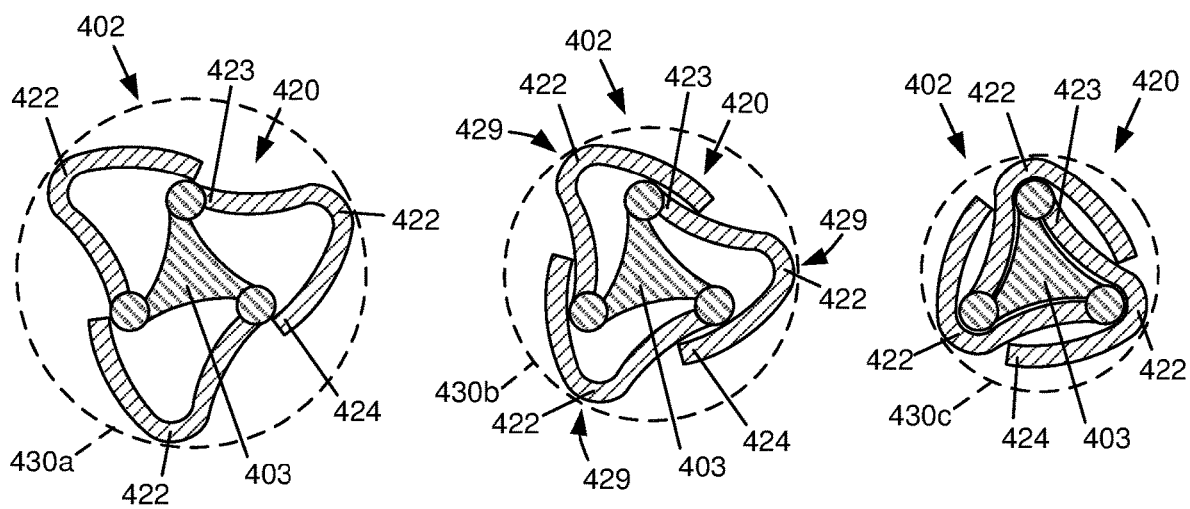
*Fig. 9a*  *Fig. 9b*  *Fig. 9c*

US 11,526,217 B2

STYLUS

BACKGROUND

An electronic device with a touch-sensitive display, such as a computing device, may enable a user to input commands by making contact with the touch-sensitive display. A user may use different input tools to make contact with the touch-sensitive display. For example, an input tool may be a stylus.

BRIEF DESCRIPTION OF THE DRAWINGS

FIGS. 4a, 4b are cross-sectional views illustrating an example of the stylus of FIG. 2 in different states from the perspective of line 4-4 of FIG. 2.

FIG. 8 is a perspective view illustrating an example of a stylus.

FIGS. 9a, 9b, 9c are cross-sectional views illustrating an example of the stylus of FIG. 8 in different states from the perspective of line 9-9 of FIG. 8.

DETAILED DESCRIPTION

The present disclosure provides a stylus having a housing that is changeable or variable in shape, including shape and/or size, as a user grasps or holds the stylus such that a change or variation of the housing is sensed and used to produce or establish different settings with, for, or of the stylus. Thus, a change or variation in physical shape and/or size of the stylus may change or vary an aspect of or input to a corresponding or associated electronic or computing device.

Figure 1:
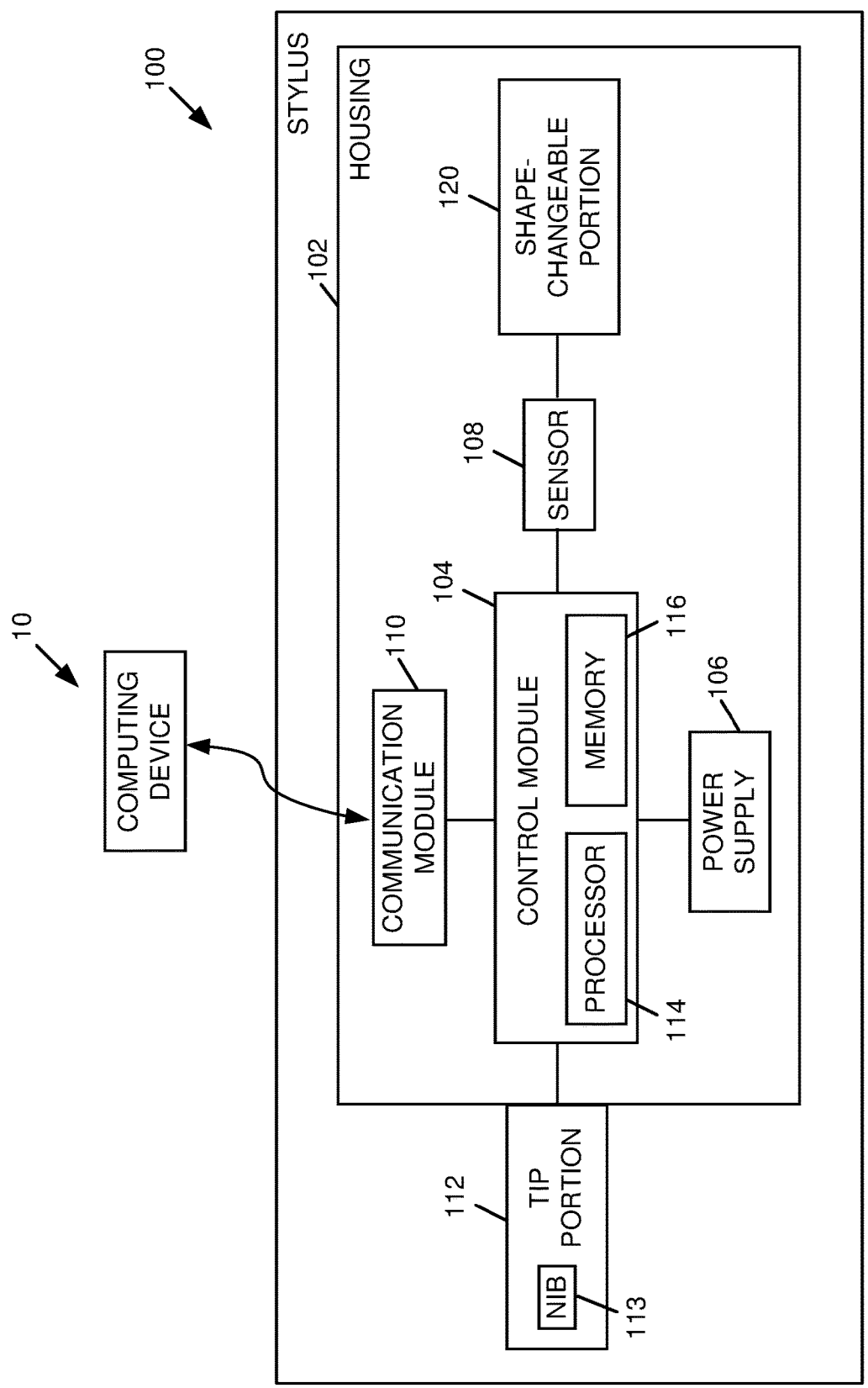
FIG. 1 is a block diagram illustrating an example of a stylus.

FIG. 1 is a block diagram illustrating an example of a stylus 100. In one example, stylus 100 includes a body or housing 102 with components, such as a control circuit or control module 104, power supply 106, sensor 108, and communication module 110 provided within housing 102, and a tip portion 112 provided at an end of housing 102. In examples, tip portion 112 includes a nib 113 for contact with an input or touch-sensitive surface of an electronic device, such as a computing device 10.

In one implementation, housing 102 includes a shape-changeable portion 120 that provides housing 102 with an effective cross-sectional area that may be varied such that variation of the effective cross-sectional area may be used to establish different settings with, for, or of stylus 100. For example, shape-changeable portion 120 may be squeezed or compressed by a user of stylus 100 to provide or establish different sizes and/or shapes of housing 102. In examples, the different sizes and/or shapes of housing 102 establish different settings with, for, or of stylus 100, as described below.

In one example, control module 104 includes a processor 114 and memory 116. Processor 114 transfers, communicates, and/or processes signals, commands, conditions, states, and/or parameters for and/or between components of stylus 100, and may include analog and/or digital elements and/or circuits. In examples, processor 114 implements and/or executes computer-readable, computer-executable instructions for data processing functions and/or functionality of stylus 100. In examples, such instructions are stored in memory, such as memory 116. Memory 116 may include volatile and non-volatile memory, and includes a non-transitory computer-readable storage medium suitable for tangibly embodying program instructions and data.

In examples, power supply 106 provides energy for operating components of stylus 100. In one implementation, power supply 106 is a rechargeable battery.

In examples, sensor 108 provides information about one or more than one condition and/or state of stylus 100. In one implementation, sensor 108 includes one or more than one instrument or device for reading, detecting, measuring, indicating, and/or responding to a condition or state of stylus 100. For example, sensor 108 may include a linear or rotational position sensor or encoder for sensing or detecting a condition or state of shape-changeable portion 120 of housing 102.

In examples, communication module 110 facilitates the exchange and/or transmission of information and/or data between stylus 100 and another device or system, including an external device such as, for example, electronic or computing device 10. Such information and/or data may include, for example, control and/or logic instructions or commands, condition or state information, as well as other information and/or data to be exchanged with and/or transmitted to and/or from stylus 100. In one implementation, communication module 110 transmits information or data regarding a condition or state of shape-changeable portion 120 of housing 102 to an external device such as, for example, electronic or computing device 10.

Figure 2:
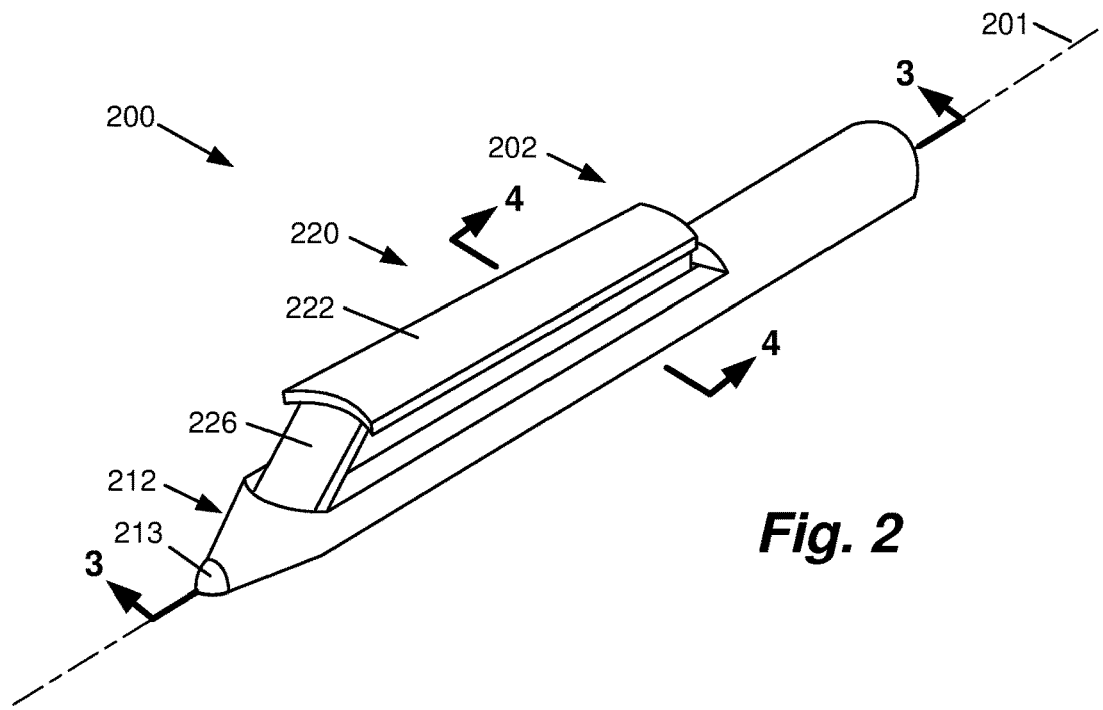
FIG. 2 is a perspective view illustrating an example of a stylus.
Figure 3:
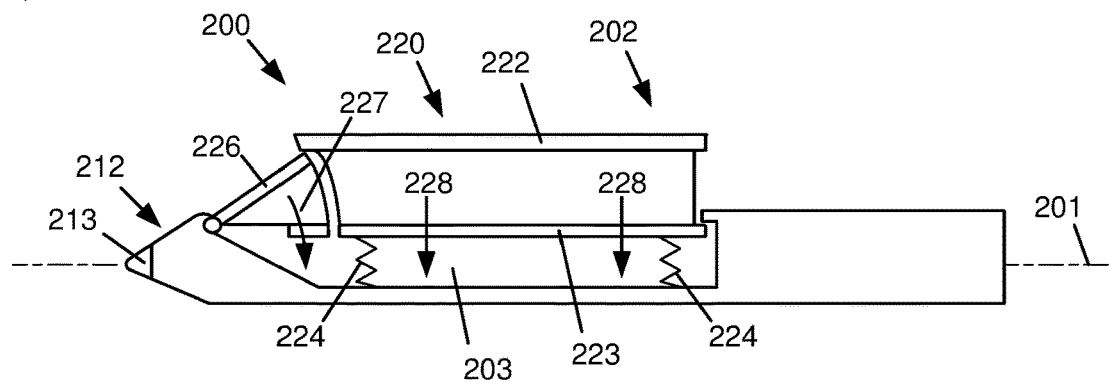
FIG. 3 is a cross-sectional view illustrating an example of the stylus of FIG. 2 from the perspective of line 3-3 of FIG. 2.

FIG. 2 is a perspective view illustrating an example of a stylus 200 in accordance with the present disclosure, and FIG. 3 is a cross-sectional view illustrating an example of stylus 200 from the perspective of line 3-3 of FIG. 2. In one example, stylus 200 includes a body or housing 202 with a tip portion 212, including a nib 213, provided at an end of housing 202. In one example, components of stylus 200, such as those illustrated and described above with reference to FIG. 1, including, for example, an example of control module 104, an example of power supply 106, an example of sensor 108, and an example of communication module 110, are provided within housing 202.

In one implementation, housing 202 of stylus 200 includes a shape-changeable portion 220, as an example of shape-changeable portion 120 (FIG. 1). As such, shape-changeable portion 220 provides housing 202 with an effective cross-sectional area that may be varied to establish different settings with, for, or of stylus 200.

In the illustrated example, shape-changeable portion 220 includes a movable section 222 supported in a cavity 203 of housing 202. More specifically, in one implementation, movable section 222 has a generally I-shaped cross-section and includes a bottom flange 223 slidably supported within cavity 203. As such, movable section 222, including, more specifically, bottom flange 223 of movable section 222, may be advanced into cavity 203, as represented by arrows 228.

In one example, movable section 222 of shape-changeable portion 220 is biased, for example, by one or more than one spring 224, to a default position or state, as illustrated in FIGS. 2 and 3, and described below. In addition, movable section 222 is depressed or compressed in a direction substantially perpendicular to a longitudinal axis 201 of stylus 200, as described below. Thus, in one example, shape-changeable portion 220 is changeable in shape in a direction transverse to longitudinal axis 201 of stylus 200.

In one example, a hinged section 226 is provided between tip portion 212 and movable section 222. In one implementation, hinged section 226 is supported at one end by housing 202 and contacted at an opposite end by movable section 222 such that hinged section 226 pivots, as represented by arrow 227, as movable section 222 is depressed or compressed.

In one implementation, as illustrated in the example of FIGS. 4a, 4b, movable section 222 of shape-changeable portion 220 is moved relative to housing 202 including, more specifically, within cavity 203 of housing 202, to establish different conditions or states of stylus 200. More specifically, in one example, movable section 222 is depressed or compressed, as represented by arrow 229, to vary a position of movable section 222 and change an effective cross-sectional area of shape-changeable portion 220. Movable section 222 is depressed or compressed, for example, against a bias force of spring or springs 224 (FIG. 3). In one example, movable section 222 of shape-changeable portion 220 is depressed or compressed by, for example, a thumb and/or finger or fingers of the hand of a user of stylus 200 as the user grasps or holds housing 202 of stylus 200.

As illustrated in the example of FIG. 4a, movable section 222 is in an extended, expanded or uncompressed position or state and, as illustrated in the example of FIG. 4b, movable section 222 is in a contracted or compressed position or state. As such, in the example of FIG. 4a, shape-changeable portion 220 of housing 202 has an effective cross-sectional area identified by dashed line 230a and, in the example of FIG. 4b, shape changeable portion 220 of housing 202 has an effective cross-sectional area identified by dashed line 230b. Accordingly, the effective cross-sectional area, as identified by, for example, dashed line 230a and dashed line 230b, represents an apparent diameter of housing 202 as sensed by the user's grip on stylus 202 (i.e., how "big" or "thick" stylus 202 feels in the user's hand). In one example, the extended, expanded or uncompressed position or state of movable section 222, as illustrated, for example, in FIG. 4a, represents a default position or state of shape-changeable portion 220.

As illustrated in the example of FIGS. 4a, 4b, the effective cross-sectional area identified by dashed line 230a is different than (i.e., greater than) the effective cross-sectional area identified by dashed line 230b. In addition, as illustrated in the example of FIG. 4a, shape-changeable portion 220 provides housing 202 with an oval-shaped barrel and, as illustrated in the example of FIG. 4b, shape-changeable portion 220 provides housing 202 with a circular-shaped barrel. Thus, with shape-changeable portion 220, a size and shape of housing 202 may be varied.

In one example, a position of movable section 222 of shape-changeable portion 220 includes and is variable between the extended, expanded or uncompressed position or state of FIG. 4a and the contracted or compressed position or state of FIG. 4b. As such, different positions of movable section 222 establish different effective cross-sectional areas of shape-changeable portion 220 of housing 202. In one example, the different positions or states of movable section 222 are sensed or detected by a sensor of stylus 200, such as sensor 108 (FIG. 1).

In one implementation, the different positions or states of movable section 222 produce or establish different settings with, for, or of stylus 200, including, for example, different commands, parameters, conditions, operations, controls, or outputs with, for, or of stylus 200. More specifically, a control module of stylus 200, such as control module 104 (FIG. 1), generates different outputs or signals that are communicated with an external device such as, for example, electronic or computing device 10. Thus, a change in actual or apparent size of stylus 200 is sensed and used to control an aspect of or input to electronic or computing device 10 with stylus 200. The change in size of stylus 200 may be used, for example, to control, vary or change line width, brushstroke, spread, feathering, coloring, shading, opacity, and/or saturation within a writing or drawing application or program of electronic or computing device 10.

For example, the extended, expanded or uncompressed position or state of FIG. 4a may produce a "fat" or wide line within a writing or drawing application or program of electronic or computing device 10, and the contracted or compressed position or state of FIG. 4b may produce a "thin" or narrow line within a writing or drawing application or program of computing device 10. As such, stylus 200 can appear to transition between a "fat" marker and a "fine-tip" pen both in physical size within a user's hand and the resulting output in a writing or drawing application or program, thus providing an intuitive input mechanism.

Figure 5:
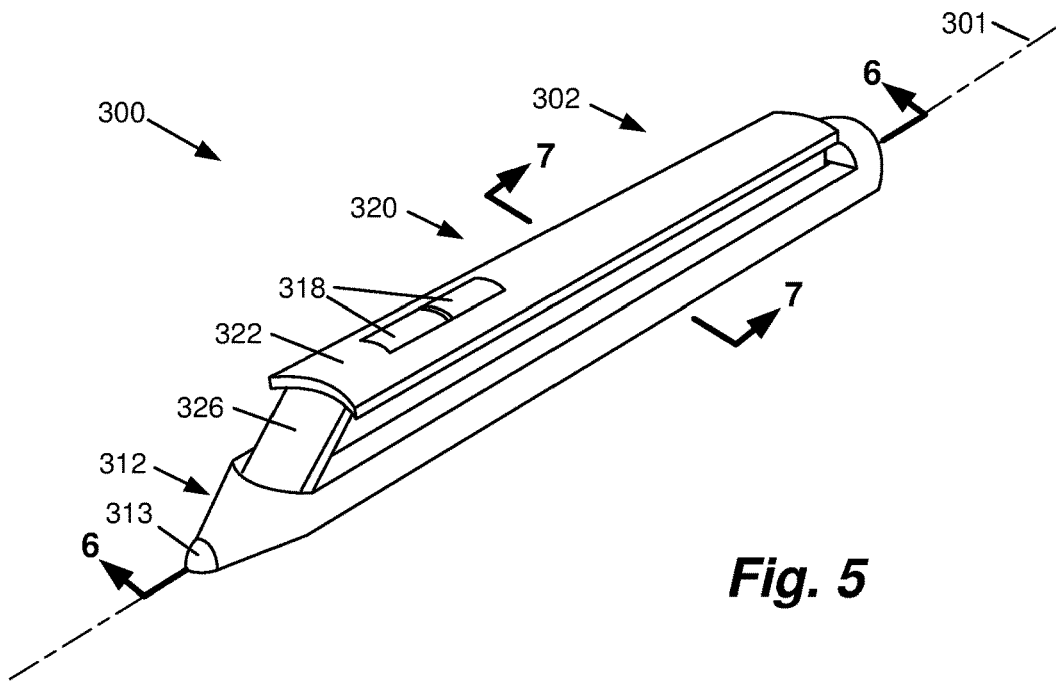
FIG. 5 is a perspective view illustrating an example of a stylus.
Figure 6:
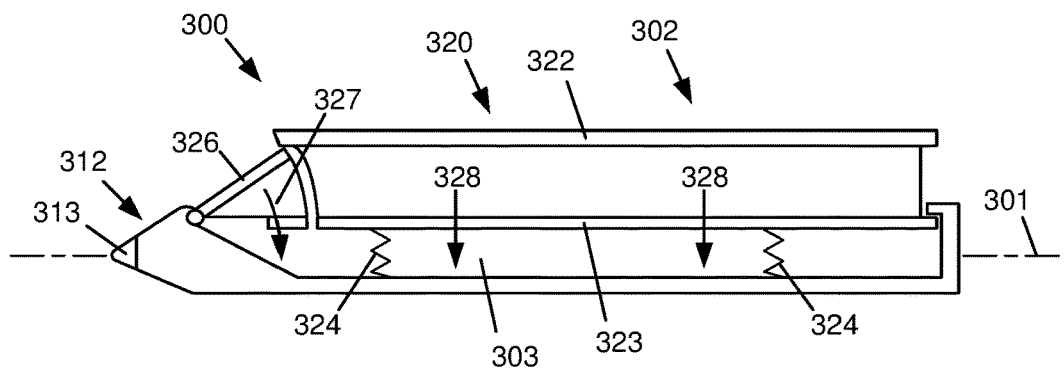
FIG. 6 is a cross-sectional view illustrating an example of the stylus of FIG. 5 from the perspective of line 6-6 of FIG. 5.

FIG. 5 is a perspective view illustrating an example of a stylus 300 in accordance with the present disclosure, and FIG. 6 is a cross-sectional view illustrating an example of stylus 300 from the perspective of line 6-6 of FIG. 5. In one example, stylus 300 includes a body or housing 302 with a tip portion 312, including a nib 313, provided at an end of housing 302. In one example, components of stylus 300, such as those illustrated and described above with reference to FIG. 1, including, for example, an example of control module 104, an example of power supply 106, an example of sensor 108, and an example of communication module 110, are provided within housing 302.

In one implementation, housing 302 of stylus 300 includes a shape-changeable portion 320, as an example of shape-changeable portion 120 (FIG. 1). As such, shape-changeable portion 320 provides housing 302 with an effective cross-sectional area that may be varied to establish different settings with, for, or of stylus 300.

In the illustrated example, shape-changeable portion 320 is similar to shape-changeable portion 220 of stylus 200 (FIGS. 2, 3) and includes a movable section 322 supported in a cavity 303 of housing 302. More specifically, in one implementation, and similar to movable section 222 of shape-changeable portion 220, movable section 322 has a generally I-shaped cross-section and includes a bottom flange 323 slidably supported within cavity 303. As such, movable section 322, including, more specifically, bottom flange 323 of movable section 322, may be advanced into cavity 303, as represented by arrows 328.

In one example, movable section 322 of shape-changeable portion 320 is biased, for example, by one or more than one spring 324, to a default position or state, as illustrated in FIGS. 5 and 6, and described below. In addition, movable section 322 is depressed or compressed in a direction substantially perpendicular to a longitudinal axis 301 of stylus 300, as described below. Thus, in one example, shape-changeable portion 320 is changeable in shape in a direction transverse to longitudinal axis 301 of stylus 300.

In one example, a hinged section 326, similar to hinged section 226, is provided between tip portion 312 and movable section 322. In one implementation, hinged section 326 is supported at one end by housing 302 and contacted at an opposite end by movable section 322 such that hinged section 326 pivots, as represented by arrow 327, as movable section 322 is depressed or compressed.

As illustrated in the example of FIGS. 5 and 6, shape-changeable portion 320 extends substantially an entire length of housing 302. In addition, in the illustrated example, one or more than one switch or button 318 for operation of stylus 300 is provided on movable section 322 of shape-changeable portion 320. Thus, in addition to switch or button 318, stylus 300 includes shape-changeable portion 320 for establishing different settings with, for, or of stylus 300, including, for example, different commands, parameters, conditions, operations, controls, or outputs with, for, or of stylus 300, similar to that described above with reference to stylus 200.

Figure 7A:
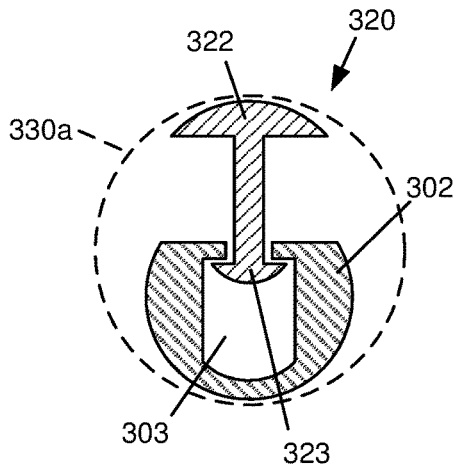
FIGS. 7a, 7b are cross-sectional views illustrating an example of the stylus of FIG. 5 in different states from the perspective of line 7-7 of FIG. 5.
Figure 7B:
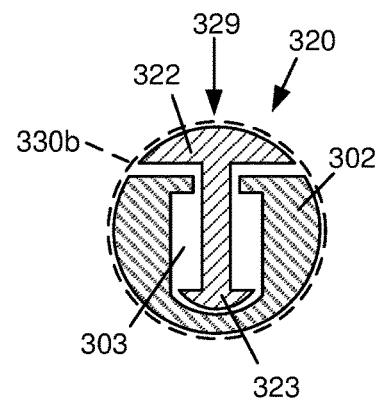

In one implementation, as illustrated in the example of FIGS. 7a, 7b, and similar to movable section 222 of the example of FIGS. 4a, 4b, movable section 322 of shape-changeable portion 320 is moved relative to housing 302 to establish different conditions or states of stylus 300. More specifically, in one example, movable section 322 is depressed or compressed, as represented by arrow 329, to vary a position of movable section 322 and change an effective cross-sectional area of shape-changeable portion 320.

As illustrated in the example of FIG. 7a, movable section 322 is in an extended, expanded or uncompressed position or state and, as illustrated in the example of FIG. 7b, movable section 322 is in a contracted or compressed position or state. As such, in the example of FIG. 7a, shape-changeable portion 320 of housing 302 has an effective cross-sectional area identified by dashed line 330a and, in the example of FIG. 7b, shape changeable portion 320 of housing 302 has an effective cross-sectional area identified by dashed line 330b. In one example, the extended, expanded or uncompressed position or state of movable section 322, as illustrated, for example, in FIG. 7a, represents a default position or state of shape-changeable portion 320.

As illustrated in the example of FIGS. 7a, 7b, the effective cross-sectional area identified by dashed line 330a is different than (i.e., greater than) the effective cross-sectional area identified by dashed line 330b. In addition, as illustrated in the example of FIG. 7a, shape-changeable portion 320 provides housing 302 with an oval-shaped barrel and, as illustrated in the example of FIG. 7b, shape-changeable portion 320 provides housing 302 with a circular-shaped barrel. Thus, with shape-changeable portion 320, a size and shape of housing 302 may be varied.

In one example, and similar to movable section 222 of stylus 200, the different positions or states of movable section 322 are sensed or detected by a sensor of stylus 300, such as sensor 108 (FIG. 1). Thus, in one implementation, and similar to movable section 222 of stylus 200, the different positions or states of movable section 322 produce or establish different settings with, for, or of stylus 300, including, for example, different commands, parameters, conditions, operations, controls, or outputs with, for, or of stylus 300.

FIG. 8 is a perspective view illustrating an example of a stylus 400 in accordance with the present disclosure. In one example, stylus 400 includes a body or housing 402 with a tip portion 412, including a nib 413, provided at an end of housing 402. In one example, components of stylus 400, such as those illustrated and described above with reference to FIG. 1, including, for example, an example of control module 104, an example of power supply 106, an example of sensor 108, and an example of communication module 110, are provided within housing 402.

In one implementation, housing 402 of stylus 400 includes a shape-changeable portion 420, as an example of shape-changeable portion 120 (FIG. 1). As such, shape-changeable portion 420 provides housing 402 with an effective cross-sectional area that may be varied to establish different settings with, for, or of stylus 400.

In the illustrated example, shape-changeable portion 420 includes an array of movable sections 422 each individually supported about a central core 403 extended along a longitudinal axis 401 of housing 402. More specifically, in one implementation, movable sections 422 each have a generally C-shaped cross-section with an end 423 supported by and pivotally or rotatably coupled to central core 403. In one example, movable sections 422 are spaced substantially equally around central core 403, and may be collapsed or nested around core 403 and each other, as described below.

In one example, movable sections 422 of shape-changeable portion 420 are formed of spring hinges and are biased, for example, to a default position or state, as illustrated in FIG. 8, and described below. In addition, movable sections 422 are collapsed or nested in a direction substantially perpendicular to longitudinal axis 401 of stylus 400, as described below. Thus, in one example, shape-changeable portion 420 is changeable in shape in a direction transverse to longitudinal axis 401 of stylus 400.

As illustrated in the example of FIG. 8, shape-changeable portion 420 extends substantially an entire length of housing 402. In addition, in the illustrated example, one or more than one switch or button 418 for operation of stylus 400 is provided on a movable section 422 of shape-changeable portion 420. Thus, in addition to switch or button 418, stylus 400 includes shape-changeable portion 420 for establishing different settings with, for, or of stylus 400, including, for example, different commands, parameters, conditions, operations, controls, or outputs with, for, or of stylus 400, similar to that described above with reference to stylus 200.

In one implementation, as illustrated in the example of FIGS. 9a, 9b, 9c, movable sections 422 of shape-changeable portion 420 are moved relative to core 403 of housing 402 to establish different conditions or states of stylus 400. More specifically, in one example, movable sections 422 are collapsed or nested, as represented by arrows 429, to vary a position of movable sections 422 and change an effective cross-sectional area of shape-changeable portion 420.

As illustrated in the example of FIG. 9a, movable sections 422 are in an extended, expanded or uncompressed position or state, as illustrated in the example of FIG. 9b, movable sections 422 are in a partially collapsed, nested or compressed position or state, and, as illustrated in the example of FIG. 9c, movable sections 422 are in a fully collapsed, nested or compressed position or state. As such, in the example of FIG. 9a, shape-changeable portion 420 of housing 402 is in an "open" condition or state and has an effective cross-sectional area identified by dashed line 430a, in the example of FIG. 9b, shape changeable portion 420 of housing 402 is in a "partially closed" condition or state and has an effective cross-sectional area identified by dashed line 430b, and, in the example of FIG. 9c, shape changeable portion 420 of housing 402 is in a "closed" condition or state and has an effective cross-sectional area identified by dashed line 430c. In one example, the extended, expanded or uncompressed position or state of movable sections 422, as illustrated, for example, in FIG. 9a, represents a default position or state of shape-changeable portion 420. In one example, movable sections 422 include a stop or catch at an end 424, or as part of the pivot mechanism at end 423, to limit an extent of opening of shape-changeable portion 420.

As illustrated in the example of FIGS. 9a, 9b, 9c, the effective cross-sectional area identified by dashed line 430a is different than (i.e., greater than) the effective cross-sectional area identified by dashed line 430b, and the effective cross-sectional area identified by dashed line 430b is different than (i.e., greater than) the effective cross-sectional area identified by dashed line 430c. In addition, as illustrated in the example of FIGS. 9a, 9b, shape-changeable portion 420 provides housing 402 with a generally triangular-shaped barrel and, as illustrated in the example of FIG. 9c, shape-changeable portion 420 provides housing 402 with a generally circular-shaped barrel. Thus, with shape-changeable portion 420, a size and shape of housing 402 may be varied.

In one example, the different positions or states of movable sections 422 are sensed or detected by a sensor of stylus 400, such as sensor 108 (FIG. 1). Thus, in one implementation, the different positions or states of movable sections 422 produce or establish different settings with, for, or of stylus 400, including, for example, different commands, parameters, conditions, operations, controls, or outputs with, for, or of stylus 400, similar to that described above with reference to stylus 200.

Figure 10:
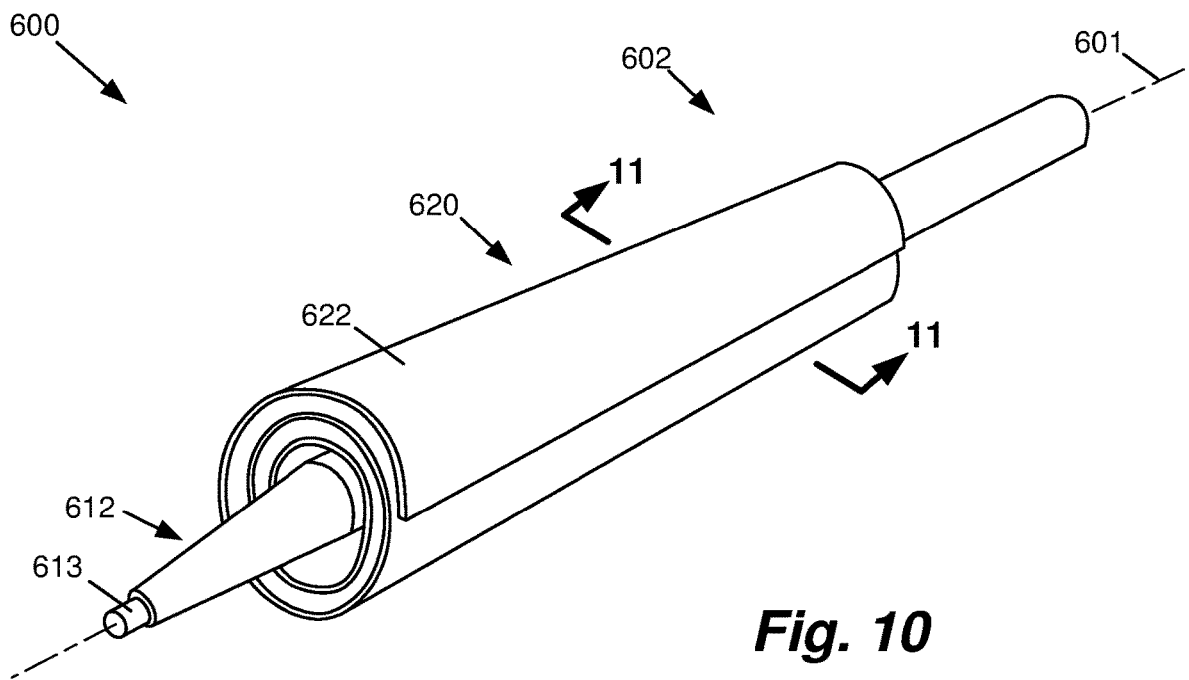
FIG. 10 is a perspective view illustrating an example of a stylus.

FIG. 10 is a perspective view illustrating an example of a stylus 600 in accordance with the present disclosure. In one example, stylus 600 includes a body or housing 602 with a tip portion 612, including a nib 613, provided at an end of housing 602. In one example, components of stylus 600, such as those illustrated and described above with reference to FIG. 1, including, for example, an example of control module 104, an example of power supply 106, an example of sensor 108, and an example of communication module 110, are provided within housing 602.

In one implementation, housing 602 of stylus 600 includes a shape-changeable portion 620, as an example of shape-changeable portion 120 (FIG. 1). As such, shape-changeable portion 620 provides housing 602 with an effective cross-sectional area that may be varied to establish different settings with, for, or of stylus 600.

In the illustrated example, shape-changeable portion 620 includes a compressible section 622 supported along a length of housing 602. More specifically, in one implementation, compressible section 622 has a rolled, spiral-shaped cross-section.

In one example, compressible section 622 of shape-changeable portion 620 is formed of a spiral flat spring and is biased, for example, to a default position or state, as illustrated in FIG. 10, and described below. In addition, compressible section 622 is compressed in a direction substantially perpendicular to a longitudinal axis 601 of stylus 600, as described below. Thus, in one example, shape-changeable portion 620 is changeable in shape in a direction transverse to longitudinal axis 601 of stylus 600.

Figure 11A:
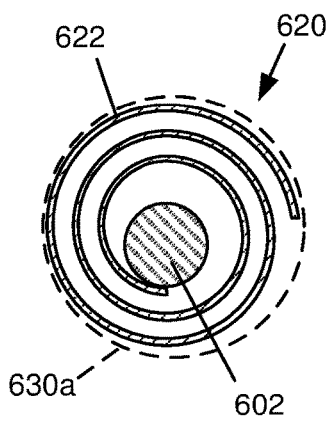
FIGS. 11a, 11b are cross-sectional views illustrating an example of the stylus of FIG. 10 in different states from the perspective of line 11-11 of FIG. 10.
Figure 11B:
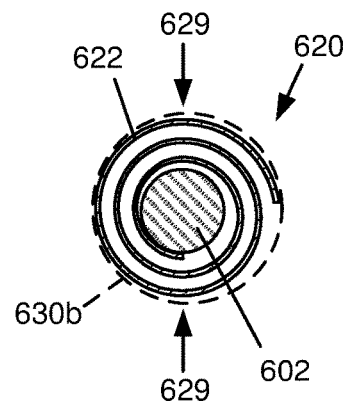

In one implementation, as illustrated in the example of FIGS. 11a, 11b, compressible section 622 is compressed, as represented by arrows 629, to vary an effective cross-sectional area of shape-changeable portion 620 and establish different conditions or states of stylus 600. More specifically, as illustrated in the example of FIG. 11a, compressible section 622 is in an expanded or uncompressed position or state and, as illustrated in the example of FIG. 11b, compressible section 622 is in a contracted or compressed position or state. As such, in the example of FIG. 11a, shape-changeable portion 620 of housing 602 has an effective cross-sectional area identified by dashed line 630a and, in the example of FIG. 11b, shape changeable portion 620 of housing 602 has an effective cross-sectional area identified by dashed line 630b. In one example, the expanded or uncompressed position or state of compressible section 622, as illustrated, for example, in FIG. 11a, represents a default position or state of shape-changeable portion 620.

As illustrated in the example of FIGS. 11a, 11b, the effective cross-sectional area identified by dashed line 630a is different than (i.e., greater than) the effective cross-sectional area identified by dashed line 630b. In addition, as illustrated in the example of FIGS. 11a, 11b, shape-changeable portion 620 provides housing 602 with a generally circular-shaped barrel. Thus, with shape-changeable portion 620, a size of housing 602 may be varied.

In one example, the different states of compressible section 622 are sensed or detected by a sensor of stylus 600, such as sensor 108 (FIG. 1). Thus, in one implementation, the different states of compressible section 622 produce or establish different settings with, for, or of stylus 600, including, for example, different commands, parameters, conditions, operations, controls, or outputs with, for, or of stylus 600.

Figure 12:
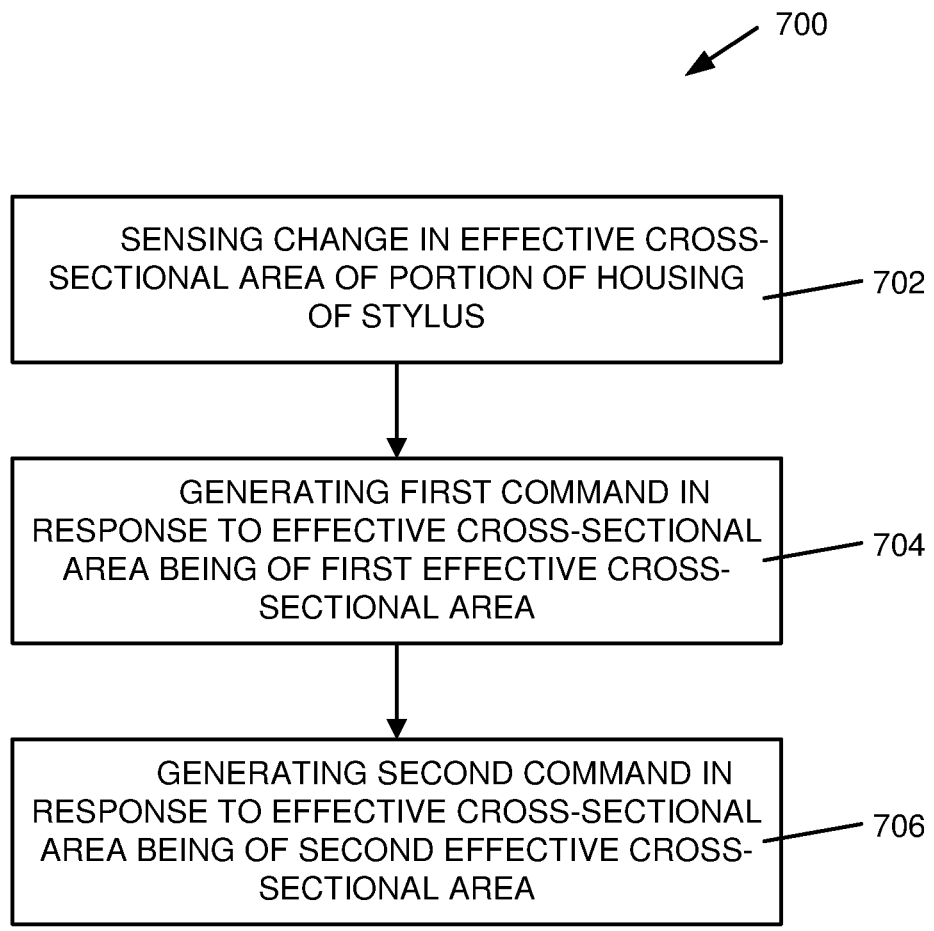
FIG. 12 is a flow diagram illustrating an example of a method of using a stylus.

FIG. 12 is a flow diagram illustrating an example of a method 700 of using a stylus, such as stylus 100, 200, 300, 400, 600, as illustrated, for example, in FIG. 1, FIGS. 2, 3, 4a, 4b, FIGS. 5, 6, 7a, 7b, FIGS. 8, 9a, 9b, 9c, FIGS. 10, 11a, 11b, respectively.

In one example, at 702, method 700 includes sensing a change in effective cross-sectional area of a portion of a housing of the stylus, such as a change in effective cross-sectional area of shape-changeable portion 120, 220, 320, 420, 620 of respective housing 102, 202, 302, 402, 602 of respective stylus 100, 200, 300, 400, 600, as illustrated, for example, in FIG. 1, FIGS. 2, 3, 4a, 4b, FIGS. 5, 6, 7a, 7b, FIGS. 8, 9a, 9b, 9c, FIGS. 10, 11a, 11b, respectively.

As such, in one example, at 704, method 700 includes generating a first command in response to the effective cross-sectional area being of a first effective cross-sectional area, as illustrated, for example, in FIG. 4a, FIG. 7a, FIG. 9a, FIG. 11a.

And, in one example, at 706, method 700 includes generating a second command in response to the effective cross-sectional area being of a second effective cross-sectional area, as illustrated, for example, in FIG. 4b, FIG. 7b, FIG. 9b, 9c, FIG. 11b.

In one implementation, sensing the change in the effective cross-sectional area of the portion of the housing, for example, at 702, includes sensing a change in size of the portion of the housing, as illustrated, for example, in FIGS. 4a, 4b, FIGS. 7a, 7b, FIGS. 9a, 9b, 9c, FIGS. 11a, 11b.

In another implementation, sensing the change in the effective cross-sectional area of the portion of the housing, for example, at 702, includes sensing a change in shape of the portion of the housing, as illustrated, for example, in FIGS. 4a, 4b, FIGS. 7a, 7b, FIGS. 9a, 9b, 9c.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. A stylus, comprising:
   a housing including a shape-changeable portion;
   a tip portion at an end of the housing; and
   a control module within the housing, the shape-changeable portion to be varied between an expanded state and a compressed state to produce different signals, with the shape-changeable portion biased to the expanded state by a spring-bias applied to the shape-changeable portion in a direction perpendicular to a longitudinal axis of the housing and to be compressed to the compressed state in a direction opposite the spring-bias, and
   the control module to generate a first signal in response to the shape-changeable portion of the housing having a first effective cross-sectional area in the expanded state and generate a second signal in response to the shape-changeable portion of the housing having a second, different effective cross-sectional area in the compressed state.

2. The stylus of claim 1, wherein the shape-changeable portion is shape-changeable in a direction transverse to the longitudinal axis of the housing.

3. The stylus of claim 1, wherein the shape-changeable portion of the housing is variable in size.

4. The stylus of claim 1, wherein the shape-changeable portion of the housing is variable in shape.

5. The stylus of claim 1, further comprising a sensor to sense variation of the shape-changeable portion of the housing.

6. The stylus of claim 1, further comprising a communication module to communicate the first signal and the second signal with an external device.

7. A stylus, comprising:
   a housing including a shape-changeable portion having an effective cross-sectional area that is varied between an expanded state and a compressed state to produce different signals that establish different settings with the stylus, the shape-changeable portion biased to the expanded state by a spring-bias applied to the shape-changeable portion in a direction perpendicular to a longitudinal axis of the housing and to be compressed against the spring-bias in an opposite direction perpendicular to the longitudinal axis to the compressed state;
   a tip portion at an end of the housing; and
   a communication module within the housing to communicate the different settings with an external device.

8. The stylus of claim 7, wherein the shape-changeable portion of the housing having the effective cross-sectional area that is varied in a direction transverse to the longitudinal axis of the housing.

9. The stylus of claim 7, wherein the shape-changeable portion of the housing having the effective cross-sectional area that is varied in size.

10. The stylus of claim 7, wherein the shape-changeable portion of the housing having the effective cross-sectional area that is varied in shape.

11. A method of using a stylus, comprising:
    sensing a change in an effective cross-sectional area of a shape-changeable portion of a housing of the stylus, including producing different signals with a change between an expanded state and a compressed state of the shape-changeable portion, the shape-changeable portion biased to the expanded state by a spring-bias applied to the shape-changeable portion in a direction perpendicular to a longitudinal axis of the housing and to be compressed to the compressed state in a direction opposite the spring-bias;
    generating a first command in response to the effective cross-sectional area being of a first effective cross-sectional area in the expanded state; and
    generating a second command in response to the effective cross-sectional area being of a second effective cross-sectional area in the compressed state.

12. The method of claim 11, wherein sensing the change in effective cross-sectional area of the portion of the housing includes sensing the change in a direction transverse to the longitudinal axis of the housing.

13. The method of claim 11, wherein sensing the change in the effective cross-sectional area of the portion of the housing includes sensing a change in size of the portion of the housing.

14. The method of claim 11, wherein sensing the change in the effective cross-sectional area of the portion of the housing includes sensing a change in shape of the portion of the housing.

15. The stylus of claim 1, wherein the shape-changeable portion provides the housing with an oval-shaped barrel in the expanded state and a circular-shaped barrel in the compressed state.

16. The stylus of claim 1, wherein the shape-changeable portion provides the housing with a triangular-shaped barrel in the expanded state and a circular-shaped barrel in the compressed state.

17. The stylus of claim 7, wherein the shape-changeable portion provides the housing with an oval-shaped barrel in the expanded state and a circular-shaped barrel in the compressed state.

18. The stylus of claim 7, wherein the shape-changeable portion provides the housing with a triangular-shaped barrel in the expanded state and a circular-shaped barrel in the compressed state.

19. The method of claim 11, wherein the shape-changeable portion provides the housing with an oval-shaped barrel in the expanded state and a circular-shaped barrel in the compressed state.

20. The method of claim 11, wherein the shape-changeable portion provides the housing with a triangular-shaped barrel in the expanded state and a circular-shaped barrel in the compressed state.

* * * * *